US006553022B2

(12) United States Patent
Hartmaier

(10) Patent No.: US 6,553,022 B2
(45) Date of Patent: *Apr. 22, 2003

(54) METHOD AND APPARATUS FOR PROVIDING A CONNECTION TO A DATA NETWORK

(75) Inventor: Peter J. Hartmaier, Woodinville, WA (US)

(73) Assignee: Openwave Systems, Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,760

(22) Filed: Jul. 16, 1998

(65) Prior Publication Data

US 2002/0136199 A1 Sep. 26, 2002

(51) Int. Cl.⁷ .............................................. H04L 12/66
(52) U.S. Cl. ...................... 370/352; 370/401; 370/252
(58) Field of Search ................................ 370/252, 330, 370/400, 401, 352–356, 386, 389; 379/230, 127; 705/34; 709/217, 219, 229; 707/10; 713/156; 340/5.8

(56) References Cited

U.S. PATENT DOCUMENTS

| 5,524,146 A | | 6/1996 | Morrisey et al. | 379/221.02 |
|---|---|---|---|---|
| 5,664,010 A | | 9/1997 | Walker et al. | 379/221.07 |
| 5,745,556 A | * | 4/1998 | Ronen | 379/127 |
| 5,867,495 A | * | 2/1999 | Elliott et al. | 370/352 |
| 5,905,719 A | * | 5/1999 | Arnold et al. | 370/330 |
| 5,958,016 A | * | 9/1999 | Chang et al. | 709/229 |
| 5,987,508 A | * | 11/1999 | Agraharam et al. | 709/217 |
| 6,023,698 A | * | 2/2000 | Lavey, Jr. et al. | 707/10 |
| 6,069,890 A | * | 5/2000 | White et al. | 370/352 |
| 6,084,956 A | * | 7/2000 | Turner et al. | 379/230 |
| 6,112,305 A | * | 8/2000 | Dancs et al. | 713/156 |
| 6,163,536 A | * | 12/2000 | Dunn et al. | 370/352 |

FOREIGN PATENT DOCUMENTS

WO        9750230        12/1997        ............ H04M/3/00

OTHER PUBLICATIONS

Jari Arkko and Klas Stenvall, "Dial–up Service Via the Integrated Access System", XP–000751710, Jan. 1, 1998, pp. 14–19.
Harald Orlamuender and Patrice Bleuse, "Handling Internet Traffic in Telecommunications Networks", XP–000720566, XVI World Telecom Congress Proceedings, Sep. 21, 1997, pp. 579–586.
International Search Report PCT/US99/16212, Nov. 15, 1999.
PCT Written Opinion dated Apr. 25, 2000.

* cited by examiner

*Primary Examiner*—Hassan Kizou
*Assistant Examiner*—John Pezzlo
(74) *Attorney, Agent, or Firm*—Fulbright & Jaworski L.L.P.

(57) ABSTRACT

A voice network node is configured to recognize the receipt of a non-routable data network access number, which may be in the form of X11, which is dialed from a subscriber terminal wishing to gain access to a data network. Either the voice network node alone, or in combination with other network nodes, requests subscriber information, including an identification of a data network service provider, from the subscriber terminal. The subscriber information is forwarded to the data network service provider identified by the subscriber information for authentication purposes. If authenticated, the subscriber terminal is connected to the data network via one of the voice network nodes. Upon termination of the connection, a voice network node sends data network connection information to the data network service provider for billing and revenue sharing purposes. In an alternate embodiment, another type of local access node, such as a cable television network node, may replace the voice network node and perform similar functions.

14 Claims, 3 Drawing Sheets

METHOD AND APPARATUS FOR PROVIDING A CONNECTION TO A DATA NETWORK

FIELD OF THE INVENTION

The present invention relates generally to providing a connection to a data network. More particularly, the present invention relates to providing a connection between a calling station and a data network via a voice network node resulting from the dialing of a predetermined access number, or via another type of local access node, such as a cable television network node.

BACKGROUND OF THE INVENTION

The Internet is a data network which is greatly increasing in popularity. There are various ways of connecting to the Internet. Many larger businesses have local area networks which are directly connected to the Internet such that computers on the local area network can gain access to the Internet. However, such a direct connection to the Internet is expensive and therefore not available to small businesses and individuals. As an alternative to the direct connection, there are Internet Service Providers (ISP), which provide access to the Internet via dial-up connections. Currently, an ISP will have a point of presence (POP), which is a network node directly connected to the Internet. The POP is accessible by subscribers to the ISP by a dial-up connection. Thus, a person wanting to connect to the Internet places a modem call to a telephone number assigned to the POP, the call gets routed to the POP, and the POP acts as the gateway to the Internet for the subscriber's computer. The ISP stores information regarding connection time for each of its subscribers for billing purposes. ISP subscribers are generally billed on a flat rate basis, a connection time basis, or some combination of flat rate and connection time.

If the POP is within the subscriber's local calling area, then the subscriber is charged for a local telephone call and the dial-up connection is generally routed from the local telephone company switch to the POP. However, when a subscriber is travelling away from home, the telephone call to the POP may result in a long distance call which will result in higher long distance charges. Further, the dial-up call may be routed via several telephone network switches prior to reaching the POP, thus tying up valuable telephone network resources. This long distance routing is generally inefficient for the telephone network, because there is often an Internet connection available to the travelling subscriber which is closer than the subscriber's home POP. However, since these POPs are operated by other ISPs, the subscriber does not have access to them. In some instances, the travelling subscriber's ISP may have a POP which is local to the location of the travelling subscriber. However, in order to access such a local POP, the subscriber must know the telephone number for dial-up access to that POP. It is inconvenient for the subscriber to remember the different telephone numbers of all the POPs operated by his/her ISP.

The problem of multiple telephone numbers for information service providers has been addressed in U.S. Pat. No. 5,524,146. That patent describes a method for automatically routing calls to customer selected information sources using a dedicated short access number (e.g. 3-digit N11 number). When an N11 number is received by the telephone switch, it triggers special processing of the call. Based on prestored selection data and/or interaction with the user, the call is routed to an appropriate information service provider. This technique is limited to the problem of connecting to information service providers which are directly connected to the telephone network. Thus, the technique described in the '146 patent merely automates the step of determining the correct telephone number to call to access a particular information service provider. Once the telephone number is determined, the call is routed to that information service provider via the telephone network in a conventional manner. In contrast, in one aspect, the present invention is concerned with the problem of connecting a subscriber calling from the telephone network to a separate data network, such as the Internet. The Internet information service providers are not directly available via a telephone call as are the service providers described in the '146 patent.

Thus, there is a need for an improved technique for connecting a computer to a data network via the telephone network, or via another type of local access node, such as a cable television network node.

SUMMARY OF THE INVENTION

In accordance with one aspect of the present invention, a voice network node is configured to recognize the receipt of a data network access number (e.g., internet access number) from a subscriber terminal, and in response, to initiate a connection between the subscriber terminal and a data network (e.g., Internet). The data network access number may be a non-routable number of the format X11. The voice network node may initiate the connection to the data network by connecting to the data network from one of its own output ports, or by routing the call to one or more other voice network nodes and connecting to the data network from an output port of one of the other voice network nodes.

In accordance with another aspect of the invention, upon receipt of the data network access number, the subscriber is requested to enter subscriber information for authentication purposes. Only if the subscriber is authenticated does the voice network node initiate a connection to the data network. In accordance with one advantage of the invention, part of the subscriber information entered by the subscriber is an identification of the data network service provider with which the subscriber has a data network access account. The voice network node performing the authentication uses this identification to determine the correct data network service provider with which to authenticate the current subscriber. In this manner, various subscribers can access the data network via this voice network node, even if these various subscribers have data network access accounts with different data network service providers.

The invention also provides for advantageous billing arrangements. In accordance with this aspect of the invention, the voice network node records connection information for each data network access session for which it is providing, or for which it has initiated, a physical connection to the data network. Upon termination of the connection, the connection information is sent to the subscriber's data network service provider. This allows for the proper billing of the subscriber by the data network service provider. It also allows for revenue sharing between the data network service provider and the company operating the nodes which provided the physical connection to the data network.

In various embodiments, the steps to be performed in accordance with the inventive technique are performed by a single network node or in a distributed fashion by multiple network nodes. The single network node, or one or more of the nodes in the multiple network node embodiment, may be a local telephone switch. Further, multiple local telephone switches may be configured to recognize the data network access number and upon receipt, to initiate a connection to the data network. In this manner, a subscriber may request connection to the data network using the same data network access number even if the subscriber is away from home.

In accordance with another embodiment of the invention, the subscriber terminal can obtain access to the data network via a local connection to another type of network, such as a cable television network. In this embodiment, the subscriber terminal does not place a telephone call, so the aspects of the invention related to the data network access number do not apply to this embodiment. However, the authentication and billing aspects of the invention apply to this embodiment.

These and other advantages of the invention will be apparent to those of ordinary skill in the art by reference to the following detailed description and the accompanying drawings.

DETAILED DESCRIPTION

Figures 1, 2:
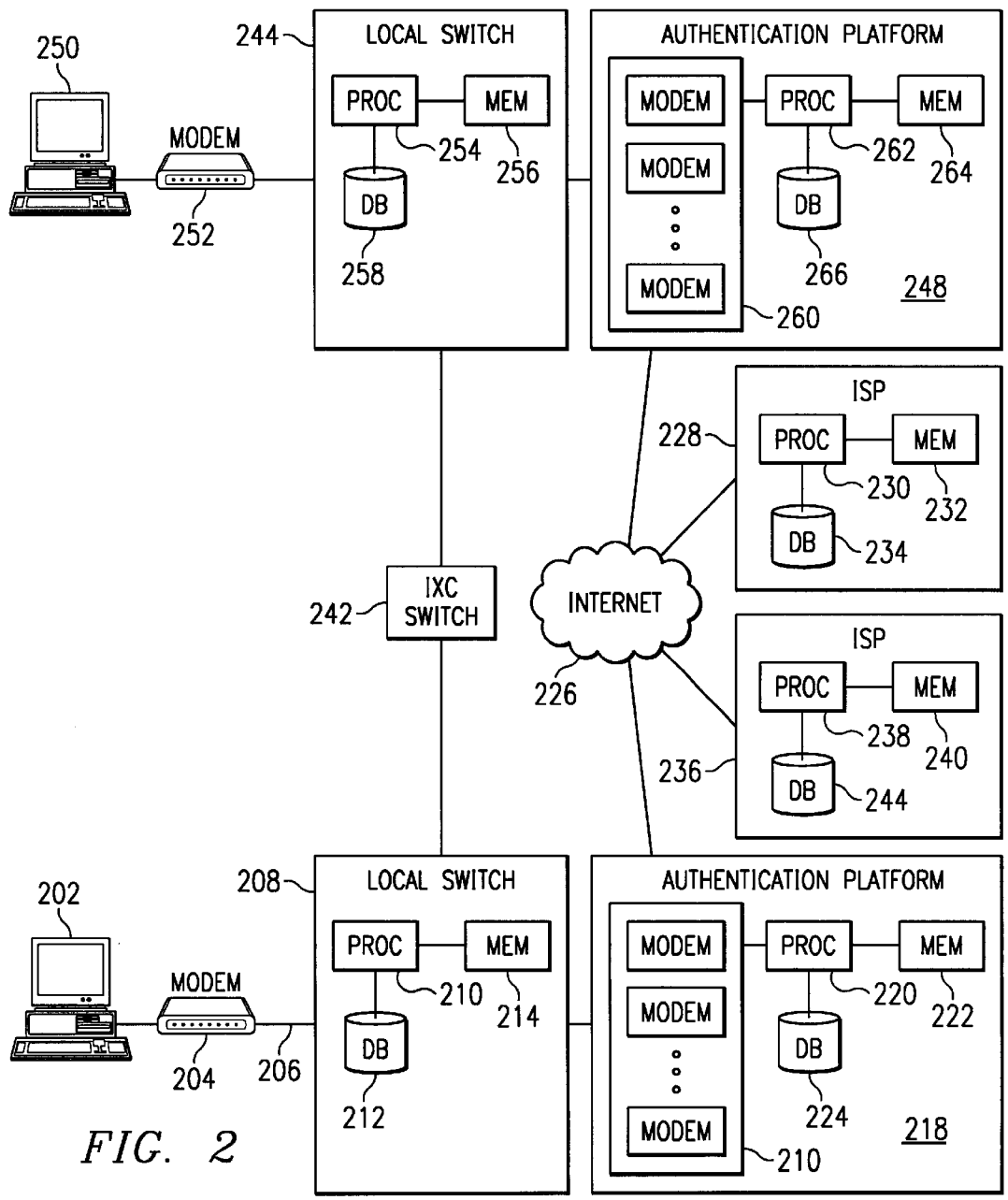
FIG. 1 shows a high level block diagram illustrating the principles of the present invention.
FIG. 2 shows a block diagram of network elements illustrating a telephone network embodiment of the invention.

FIG. 1 shows a high level block diagram illustrating the principles of the present invention. In accordance with one aspect of the invention, a subscriber computer 110 is connected to a local telephone switch 120 via communication link 112. Link 112 may be a standard twisted pair POTS (plain old telephone service) line. The local switch 120 is connected to the Internet 130 via direct link 122. As used herein, the term Internet is used to refer to any data network. The local switch 120 would also be connected to other telephone network switches (not shown) in a conventional manner. An Internet Service Provider (ISP) 140 is shown connected to the Internet 130. The ISP provides Internet access accounts to subscribers wishing to access the Internet 130. In accordance with the invention, the ISP is an administrative, authentication, and billing entity, and may not provide subscribers with a physical connection to the Internet 130.

In order to gain access to the Internet 130, a subscriber using computer 110 places a dial-up telephone call from computer 110 by dialing an Internet Access Number (IAN). The IAN is a predetermined number which, in an advantageous embodiment, is a non-routable three digit number in the form of X11 (e.g. 511). The local switch 120 is configured to recognize the IAN as an indication that computer 110 is requesting access to the Internet 130. The local switch 120 sends a message to computer 110 via line 112 requesting that the subscriber enter an ISP Identification (ISP-ID), username, and password. Upon receipt of this information from the subscriber, the local switch 120 sends an authorization request message to the ISP identified by the ISP-ID. Assume that the ISP-ID entered by the subscriber corresponds to ISP 140. Upon receipt of the authorization request message, the ISP 140 looks up the account information for the subscriber identified by the username to determine if such a user is a subscriber of ISP 140 and if the password entered by the subscriber matches the password associated with the account information stored in ISP 140. If the ISP 140 determines that the subscriber is authorized, the ISP 140 sends an appropriate authorization message to the local switch via the Internet 130. Upon receipt of the appropriate authorization message, the local switch 120 connects the dial-up telephone call received from computer 110 to the Internet 130. The local switch monitors the connection time of computer 110 and reports the information to ISP 140 for billing and revenue sharing purposes.

The invention is described in further detail in FIG. 2 which shows one embodiment of the invention. A subscriber wanting to access the Internet is using computer 202 connected to modem 204. Although modem 204 is shown external to computer 202, modem 204 could also be internal to computer 202. The modem 204 is connected to a local switch 208 via POTS line 206. The local switch 208 is an intelligent switch which includes a computer processor 210 connected to a memory 214 and database 212. The functions of switch 208 are controlled by processor 210 executing computer program instructions stored in memory 214 and/or database 212.

Local switch 208 is connected to authentication platform 218. Authentication platform 218 includes computer processor 220 connected to modem pool 210, memory 222, and database 224. Authentication platform 218 is an intelligent network node which functions under control of computer processor 220 executing computer program instructions stored in memory 222 and/or database 224. The authentication platform 218 is connected to the Internet 226. Also connected to the Internet 226 is ISP 228 and ISP 236. ISP 228 functions under control of processor 230 executing computer program instructions stored in memory 232 and/or database 234. Similarly, ISP 236 functions under control of processor 238 executing computer program instructions stored in memory 240 and/or database 244.

Also shown in FIG. 2 is another computer 250 connected to modem 252. Modem 252 is connected to another local switch 244. Local switch 244 includes a computer processor 254 connected to memory 256 and database 258. The functions of switch 244 are controlled by processor 254 executing computer program instructions stored in memory 256 and/or database 258. Local switch 244 is connected to authentication platform 248 which includes computer processor 262 connected to modem pool 260, memory 264, and database 266. Authentication platform 248 is an intelligent network node which functions under control of computer processor 262 executing computer program instructions stored in memory 264 and/or database 266. Authentication platform 248 is connected to the Internet 226. Interexchange switch 242 is shown connecting local switch 208 and local switch 244.

Figure 3:
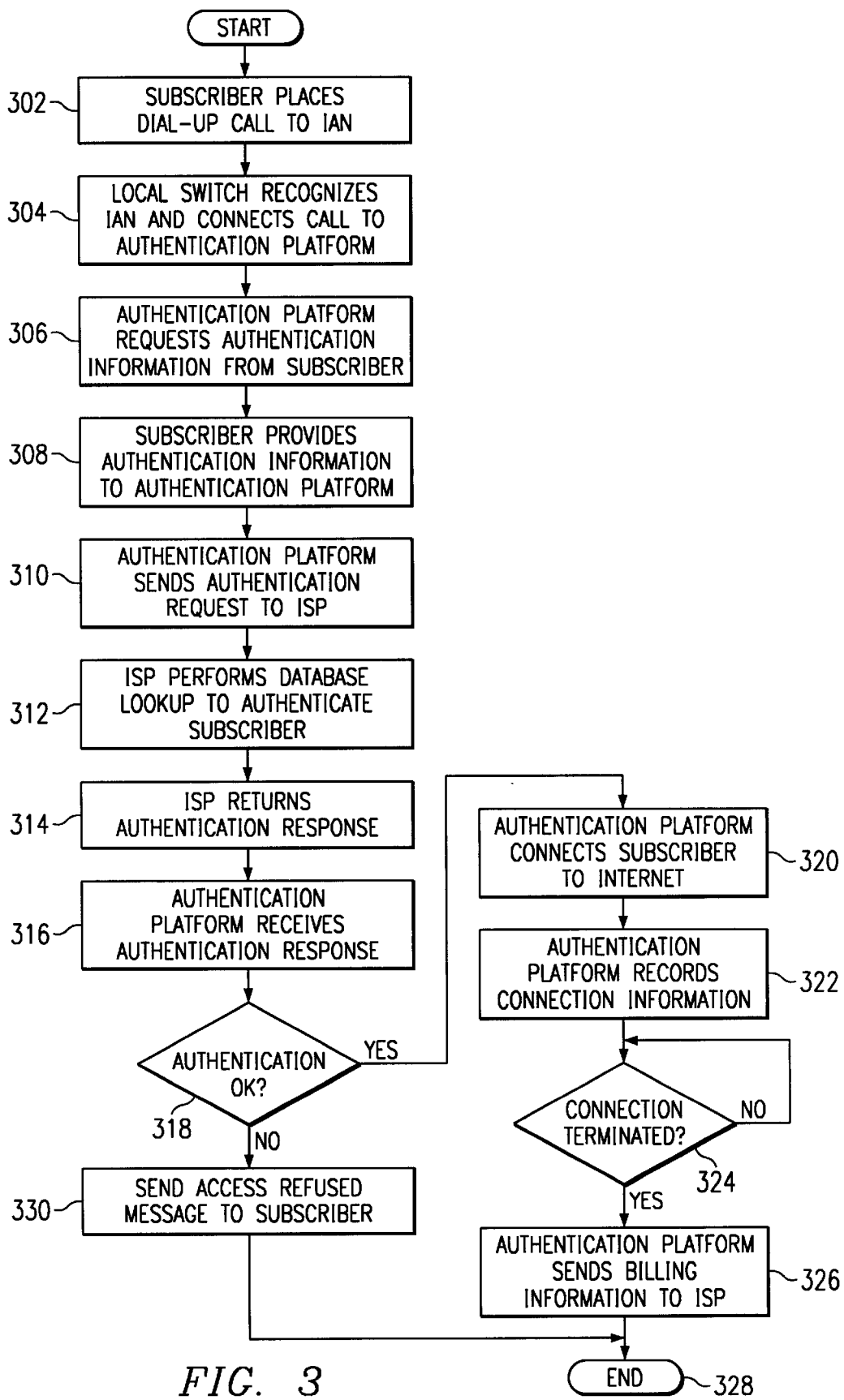
FIG. 3 is a flowchart showing the steps performed in accordance with one embodiment of the invention.

The method steps performed in accordance with the present invention in order to provide computer 202 with access to the Internet 226 are described below in accordance with the flowchart of FIG. 3. In step 302 a subscriber using computer 202 places a dial-up modem call utilizing modem 204 to an Internet access number (IAN). For purposes of this example, the IAN is 511. The IAN digits are transmitted from modem 204 to local switch 208 via POTS line 206. In step 304 the local switch 208 recognizes the IAN as a non-routable telephone number and as a request for access to the Internet, as distinguished from a request to place an ordinary telephone call. Upon recognizing the IAN, the local switch 208 is configured to connect the call to the authentication platform 218. The call is received by the authentication platform 218 and is assigned to one of the available modems in the modem pool 210. In step 306 the authentication platform 218 sends a message to computer 202 requesting authentication information, including an ISP-ID, userid, and password, from the subscriber. In step 308 the subscriber transmits the ISP-ID, userid, and password to the authentication platform 218.

The ISP-ID entered by the subscriber will identify the ISP with which the subscriber has an Internet access account. For purposes of this example, assume that the subscriber has an Internet access account with ISP 228, and that the ISP-ID entered by the subscriber identifies ISP 228. In step 310 the authentication platform 218 sends an authentication request, including the username and password entered by the subscriber, to ISP 228 via the Internet 226. The ISP 228 has an Internet address which the authentication platform 218 looks up in a database using the ISP-ID. This database could be internal to the authentication platform 218, or it could be external to the authentication platform (e.g. connected to the Internet).

Upon receipt of the authorization request, in step 312 the ISP 228 determines whether the supplied username and password correspond to an authorized subscriber who has an Internet access account with ISP 228 by performing a database lookup. The ISP 228 stores subscriber profile records in database 234. These subscriber profile records contain usernames, passwords, and billing information for each subscriber who has an Internet access account with the ISP 228. Thus, if the supplied username and password correspond to a valid subscriber profile record stored in database 234, the ISP 228 determines that the subscriber is authorized. In step 314, the ISP 228 returns an authentication response to the authorization platform 218 indicating whether the subscriber is an authorized subscriber to ISP 228. In step 316 the authentication platform 218 receives the authentication response.

In step 318 the authentication platform 218 determines whether the subscriber is authorized based on the response received from the ISP 228. If the authentication message received from the ISP 228 indicates that the subscriber is not authorized, then in step 330 the authentication platform 218 sends a message to the computer 202 indicating that access to the Internet is refused and the method ends in step 328. If the authentication message received from the ISP 228 indicates that the subscriber is authorized, then in step 320 the authentication platform 218 connects the subscriber to the Internet 226 via an output port of authentication platform 218.

In step 322 the authentication platform 218 begins recording connection information for the subscriber. When the subscriber terminates the connection with local switch 208 (i.e. hangs up), the authentication platform 218 recognizes that the communication link has been terminated and the test in step 324 is YES and control passes to step 326. In step 326 the authentication platform 218 sends billing information to the ISP 228 via the Internet 226. Such billing information includes the username, connection time, and an identification of the telecommunication company operating the local switch 208 and authentication platform 218. The method ends in step 328.

The billing information sent to the ISP 228 in step 326 allows for revenue sharing between the ISP 228 and the company operating authentication platform 218 and local switch 208. As described above, the ISP 228 is an administrative, authentication, and billing entity, and does not provide subscribers with a physical connection to the Internet. The physical connection is provided by local switch 208 and authentication platform 218, which would typically be operated by a local telephone company. The billing information sent to the ISP 228 allows the ISP 228 to bill the subscriber for access to the Internet. Since the billing information sent to the ISP 228 includes an identification of the telecommunication company operating the local switch 208 and authentication platform 218, it allows the ISP 228 to share the subscriber revenue with the company providing the physical access to the Internet.

In accordance with one advantage of the invention, the subscriber could travel to a different location and still gain access to the Internet in the same manner as if the subscriber were using his/her home computer 202. The invention also allows for beneficial billing and revenue sharing as follows. Consider now that the same subscriber that was using computer 202 to connect to the Internet 226 from home is traveling and is using computer 250 which is located outside the area serviced by local switch 208 and authentication platform 218. Instead, computer 250 is connected to modem 252 which is connected to local switch 244. Assume that local switch 244 is configured in a manner similar to that of local switch 208 such that it recognizes the dialing of the IAN (e.g. 511) as a request for connection to the Internet 226. In accordance with the steps described above in connection with FIG. 3, the subscriber now at computer 250 will initiate a dial-up call to the IAN from computer 250. Upon receipt of the IAN digits, the local switch 244 will recognize that the call is requesting access to the Internet 226. Thus, local switch 244 connects the call to authentication platform 248. The call is received by the authentication platform 248 and is assigned to one of the available modems in the modem pool 260. The authentication platform 248 will request authorization information from the subscriber now using computer 250. The subscriber enters in the same ISP-ID, userid, and password, as was entered when using computer 202. Thus, even though the subscriber is at a different computer, he/she dials the same IAN and enters the same authentication information, making accessing the Internet more convenient. In a manner similar to that described above, the authentication information is sent to ISP 228, the ISP 228 authenticates the subscriber and sends an authentication message to authentication platform 248, and the subscriber using computer 250 is connected to the Internet.

When the Internet access session is terminated, the authentication platform 248 sends billing information to the ISP 228. Since the billing information includes the identification of the telecommunication company operating the local switch 244 and authentication platform 248, the ISP 228 can now share the billing revenue from this Internet access session with the appropriate telecommunications company which provided the physical access to the Internet.

Thus, as can be seen, even though the subscriber has traveled to a different geographic location and is gaining physical access to the Internet from a different local telephone company, the subscriber's steps to access the Internet are the same as when accessing the Internet from the subscriber's home computer 202. Even the telephone number dialed, the IAN, remains the same. The subscriber uses the same ISP and thus billing is simplified. Further, the ISP is able to engage in revenue sharing with the appropriate local telephone company providing physical access to the Internet.

In accordance with another advantage of the invention, different subscribers having accounts with different ISPs, can use the same computer to connect to the Internet in the same manner, and correct billing will take place. Assume that computer 202 is now being used by another subscriber having an Internet access account with ISP 236 instead of ISP 228. The subscriber establishes a connection to the Internet 226 in the same way as described above by dialing the IAN. When the subscriber is requested to enter his/her authentication information, the subscriber enters his/her username, password, and ISP-ID identifying ISP 236 as this subscriber's ISP. The subscriber is authenticated using ISP 236 and is provided with access to the Internet as described above. When the subscriber terminates the connection, the authentication platform 218 sends billing information to ISP 236, so that ISP 236 can correctly bill the subscriber and share the revenue with the local telephone company operating local switch 208 and authentication platform 218.

The principles of the present invention may be implemented in many different embodiments by one skilled in the art. For example, referring back to the example discussed above in connection with FIG. 3, it is possible that in step 304 authentication platform 218 may not have any available modems in the modem pool 210 such that no modem can be assigned for use by the subscriber connecting to the Internet. In this case, the authentication platform 218 would send an appropriate message back to the local switch 208. The local switch could then re-route the call in a conventional manner to another authentication platform, such as authentication platform 248, via IXC switch 242 and local switch 244.

In another alternate embodiment, the authentication platforms 218, 248 could be integrated into the local switches 208, 244 respectively. Thus, the appropriate computer program instructions could be included in the memory (214, 256) and database (212, 258) of local switches 208, 244 respectively, such that the functions of the authentication platforms are performed by the local switches. As would be understood by one skilled in the art, the functions to be performed in accordance with the present invention may be performed by one network node, or in a distributed fashion by multiple network nodes.

In yet another alternate embodiment, although the modem pools 210, 260 are shown to be components of authentication platforms 218, 248 respectively, such modem pools could be included as components of the local switches 208, 244, or the modem pools could be external to both the authentication platforms 218, 248 and the local switches 208, 244.

In yet another alternate embodiment, although the ISPs 228, 236 are shown to be separate entities, since these ISPs provide administrative, authentication, and billing functions, and not physical connection to the Internet, they could be placed anywhere within the telecommunication network or within the Internet 226. All that is needed to provide these functions is an appropriately configured computer system including a computer processor executing appropriate computer program instructions to carry out the ISP functions and appropriate storage (e.g. memory and database). In fact, multiple ISPs could share a single computer system, as long as the information for each ISP is logically separate from the other ISP within such shared computer system. Alternatively, the ISP functions could be integrated into other network nodes.

Figure 4:
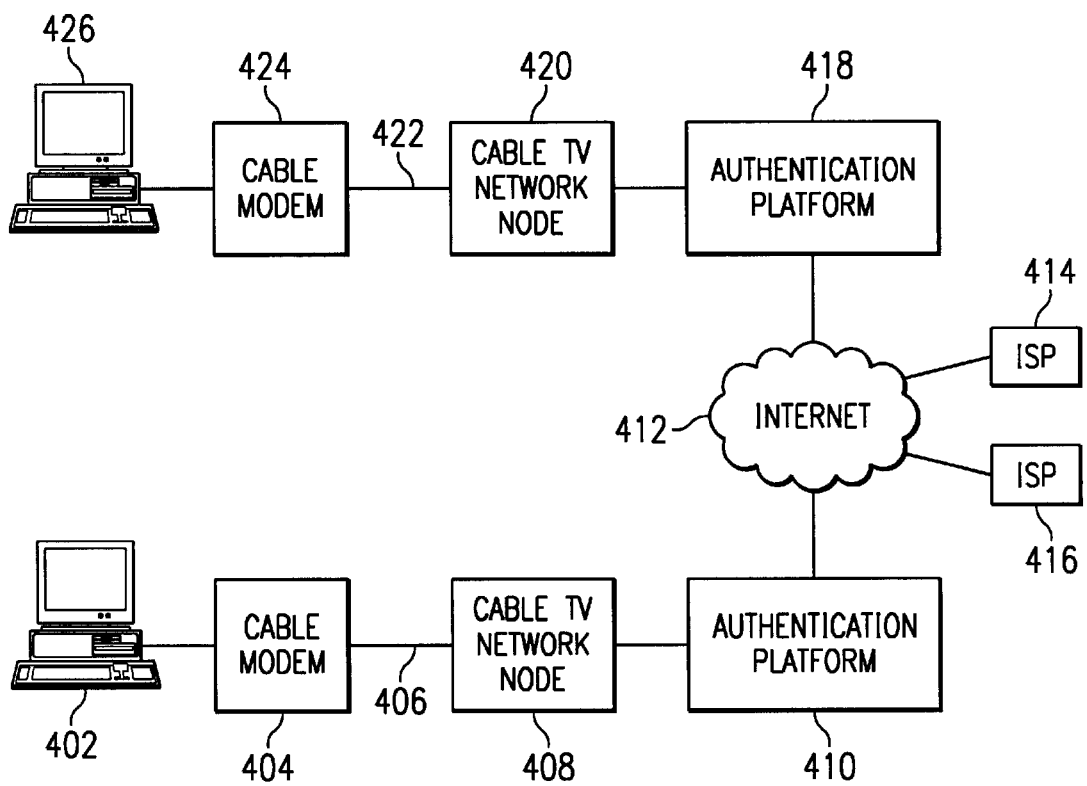
FIG. 4 shows a block diagram of network elements illustrating a cable television network embodiment of the invention.

In another embodiment of the invention, the subscriber terminal is connected to the internet via a local connection to a cable television network node. Such an embodiment is shown in FIG. 4. A subscriber wanting to access the Internet 412 is using computer 402 connected to cable modem 404. Cable modem 404 is connected to cable television network node 408 via coax cable 406. It is noted that cable 406 could also be a combination of coax cable and fiber optic cable. Cable television network node 408 and coax cable 406 are part of the cable television network. Cable television network node 408 is connected to authentication platform 410. The authentication platform is connected to the Internet 412. Also connected to the Internet 412 is ISP 414 and ISP 416. FIG. 4 also shows computer 426 connected to cable modem 424. Cable modem 424 is connected to cable television network node 420 via coax cable 424. Cable television network node 420 is also connected to authentication platform 418 which is connected to the Internet 412.

The elements of the embodiment shown in FIG. 4 are very similar to the embodiment shown in FIG. 2 except that the local telephone switches 208 and 244 of FIG. 2 are replaced with cable television network nodes 408 and 420 respectively. Although not shown in FIG. 4, each of the cable television network nodes 408 and 420 would contain a processor, memory, and database, similar to the local switches 208 and 244 of FIG. 2. Of course, cable television network nodes 408 and 420 would also contain other elements appropriate for a cable television node. Each of the authentication platforms 410 and 418 would also contain a modem pool, processor, memory, and database, similar to the authentication platforms 218 and 248 of FIG. 2. The modem pools of authentication platforms 410 and 418 would contain cable modems in order to properly communicate via the cable television network. ISP 414 and ISP 416 are configured, and operate, the same as ISPs 228 and 236 of FIG. 2. Thus, in the embodiment of FIG. 4, the computers 402 and 426 are connected to the cable television network via cable modems 404 and 424 respectively. The use of cable modems to connect computers to a cable television network is well known in the art.

The method steps performed in accordance with the present invention in order to provide computer 402 with access to the Internet 412 are the same as those described above in accordance with the flowchart of FIG. 3. However, in the embodiment of FIG. 4, steps 302 and 304 would not be performed because computer 402 is not required to place a dial-up call when connecting to the Internet via a cable modem and cable television network. Instead, when computer 402 properly establishes a connection with cable television network node 408, the cable television network node 408 recognizes that a computer is connecting and the computer 402 is automatically connected to the authentication platform 410. Otherwise, the steps of FIG. 3 are performed in a similar manner in the embodiment shown in FIG. 4.

As will be recognized by those skilled in the art, the mobility, authentication, billing, and revenue sharing benefits of the invention, as described above in connection with the embodiment described in connection with FIG. 2, will apply in a similar manner to the embodiment of FIG. 4.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, although the subscriber terminals are shown connected to the voice and cable networks via wired communication links, these connections could also be provided via wireless communication links.

I claim:

1. A system for connecting a calling station to a data network through a local switch, wherein said calling station is associated with one or more Internet Service Providers (ISPs), wherein the ISPs provide authentication and billing services, comprising:

means for receiving, from said calling station, a unique, non-routable dialed digit string, wherein said dialed digit string signifies a request to connect to said data network;

means, at the local switch, for requesting information from said calling station in response to said unique dialed digital string, wherein said requested information identifies a requested ISP and authentication information;

means, at the local switch, for authenticating said calling station with said requested ISP to authorize connection of said calling station to said data network via the local switch after receiving an authorization message from the ISP; and means for connecting said calling station to said data network via the local switch, when said means for authenticating determines that connection of said calling station to said data network is authorized, wherein said connecting means monitors a connection time for said calling station and reports the connection time to the ISP after the connection is terminated.

2. The system of claim 1 further wherein said means for connecting connects said calling station to a modem to allow said calling station to communicate data via said data network.

3. The system of claim 1 wherein said information further comprises:

a user identification; and a password.

4. The system of claim 1 further comprising:

means for recording connection information, wherein said means for recording connection information determines when said calling station terminates its connection to said data network; and wherein said connection information includes identification of a telecommunication company.

5. The system of claim 1 wherein said means for requesting information, and said means for authenticating are implemented on an Intelligent Peripheral.

6. The system of claim 1 wherein said data network is associated with a cable television network.

7. A method for connecting a calling station to a data network through a local switch, comprising:

receiving a unique, non-routable dialed digit string from said calling station, wherein said unique dialed digit string signifies a request to connect said data network;

requesting information from said calling station in response to said received unique dialed digit string, wherein said requested information identifies a requested Internet Service Provider (ISP) and authentication information, wherein the ISP provides billing and authentication services;

receiving said requested information from said calling station;

authenticating said service information with said requested ISP to authorize connection of said calling station to said data network;

connecting said calling station to said data network via the local switch, when said calling station is authorized by said requested ISP to connect to said data network by an authentication message sent by the ISP to the local switch;

monitoring a connection time for said calling station; and reporting the connection time to the ISP after the connection is terminated.

8. The method of claim 7 further comprising:

establishing a dial-up connection between said calling station and a modem.

9. The method of claim 7 wherein said information further comprises:

a user identification; and a password.

10. The method of claim 7 wherein said steps of requesting information and authenticating said information are performed by an Intelligent Peripheral.

11. The method of claim 7 wherein said data network is associated with a cable television network.

12. An intelligent network node for connecting a calling station to a data network through a local switch, comprising:

means for receiving a call connection request from said calling station at the local switch, wherein said call connection request is a non-routable dialed digit string;

means, at the local switch, for requesting authentication information from said calling station, wherein said requested authentication information includes a requested Internet Service Provider (ISP), a user identification, and a password;

means, at the local switch, for authenticating said calling station with said requested ISP to determine whether said calling station is authorized to be connected to said data network;

means for connecting said calling station to said data network via the local switch when said means for authenticating determines that said calling station is authorized to be connected to said data network and sends authorization message to the local switch, and means for monitoring a connection time for said calling station and for reporting the connection time to the ISP after the connection is terminated.

13. The intelligent network node of claim 12 further comprising:

means for assigning said calling station to a modem of a modem pool.

14. The intelligent network node of claim 12 wherein said data network is associated with a cable television network.

* * * * *